INVENTOR.
BY John A. Brazee
Blair & Buckles
Attorneys

Sept. 24, 1963 J. A. BRAZEE 3,105,108

MULTIPLE-PAIR ELECTRIC CABLE CONSTRUCTION

Filed April 11, 1961 2 Sheets-Sheet 2

INVENTOR.

BY John A. Brazee

Blair & Buckles

Attorneys

United States Patent Office 3,105,108
Patented Sept. 24, 1963

3,105,108
MULTIPLE-PAIR ELECTRIC CABLE CONSTRUCTION

John A. Brazee, Wallingford, Conn., assignor to The Whitney Blake Company, New Haven, Conn.
Filed Apr. 11, 1961, Ser. No. 102,215
4 Claims. (Cl. 174—112)

Figure 1:
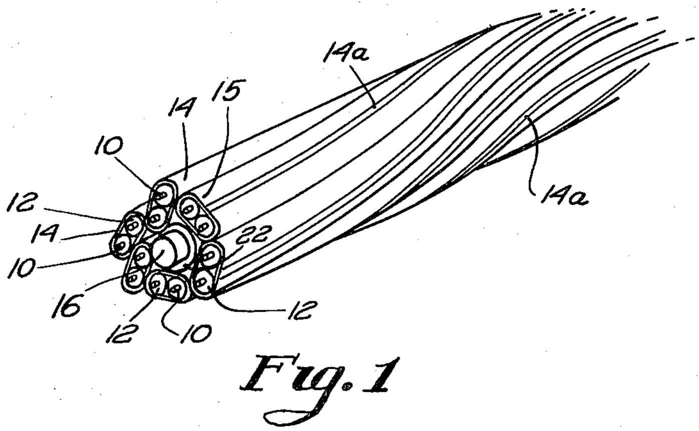

This invention relates to an improved multiple-pair electric cable. More specifically, it relates to a distribution wire in which each pair of conductors is separately jacketed. This construction substantially reduces changes in attenuation between wet and dry environment conditions, thereby facilitating signal propagation over substantial distances.

Distribution wire is used in applications that require conductors to be tapped from a cable at various lengths. An illustrative installation is a telephone cable strung overhead on a residential street, with a different pair of conductors tapped from the cable at each residence. It is impractical to enclose such cable in an outer, over-all, protective jacket, since the jacket would have to be severed and removed at each place where the conductors are tapped. Accordingly, the insulated conductors are exposed to changes in various weather conditions, the most significant of which is relative humidity.

The maximum length over which a communications cable is operable is restricted by its attenuation characteristics. Attenuation diminishes the amplitude of a signal carried by the cable, thus rendering it less audible. Also, since the attenuation varies with frequency, the frequency characteristics of the signal are distorted by the cable. Accordingly, such devices as electronic repeaters (amplifiers) and loading networks are installed at successive intervals along the line to amplify the signal and correct its distortion.

In distribution wires used prior to my invention, excessive attenuation during high humidity conditions has restricted the maximum cable length between terminal or repeater equipment; that is, it would have required an excessive number of repeaters for a given length of cable. Moreover, the signal amplitude in such cables varies widely due to large changes in attenuation between dry and wet conditions, and commercially available repeaters do not have the dynamic range necessary to cope with these variations. Since the change in attenuation is greater at higher frequencies, these problems are particularly acute in carrier frequency operation, in which the message signal modulates a high-frequency carrier. Thus, the use of distribution wire has been limited, as a practical matter, to relatively short runs, particularly in the case of carrier frequency operation. In addition, loading has been impractical as a method of compensating impedance characteristics because of the wide variations thereof.

Accordingly, it is a principal object of my invention to provide an improved multiple-pair electric cable.

A more specific object of my invention is to provide a multiple-pair distribution wire having relatively stable electrical characteristics under changing weather conditions. In particular, the distribution wire should be characterized by a smaller change in attenuation between wet and dry atmospheric conditions than available with prior cables of this type.

Another object of my invention is to provide a cable of the above type having lower attenuation in a wet environment than heretofore available.

It is a further object of my invention to provide a distribution wire suitable for carrier frequency operation.

A still further object of my invention is to provide a distribution wire suitable for operation over a longer distance than prior cables of this type. More particularly, an object of the invention is to provide a distribution wire suitable for use with a plurality of amplifiers disposed at intervals along the wire.

Still another object of my invention is to provide a distribution wire in which all the conductors are readily accessible for identification and connection over the entire length thereof.

The invention accordingly comprises the features of construction, combination of elements and arrangement of parts which will be exemplified in the construction hereinafter set forth and the scope of the invention will be indicated in the claims.

Figure 2:
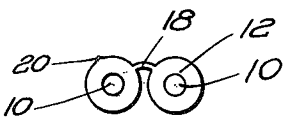
Figure 3:
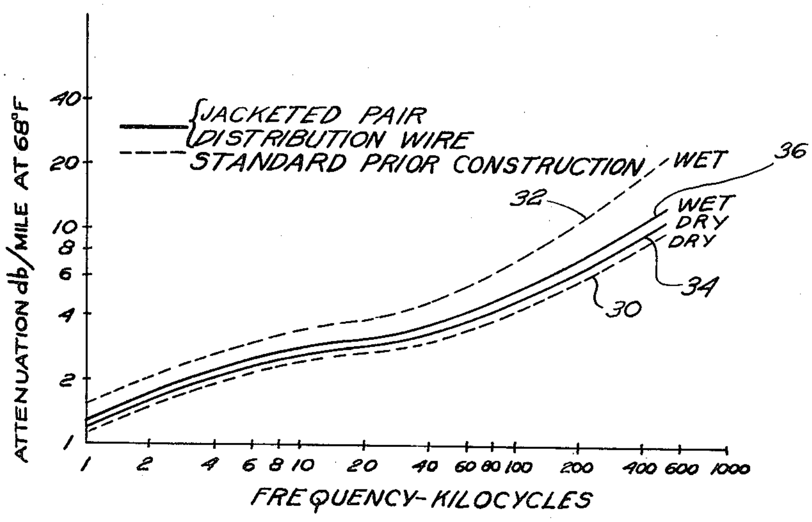
Figure 4:
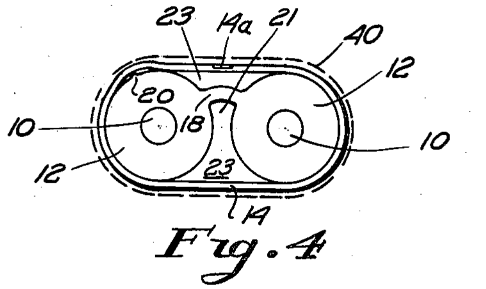
Figure 5:
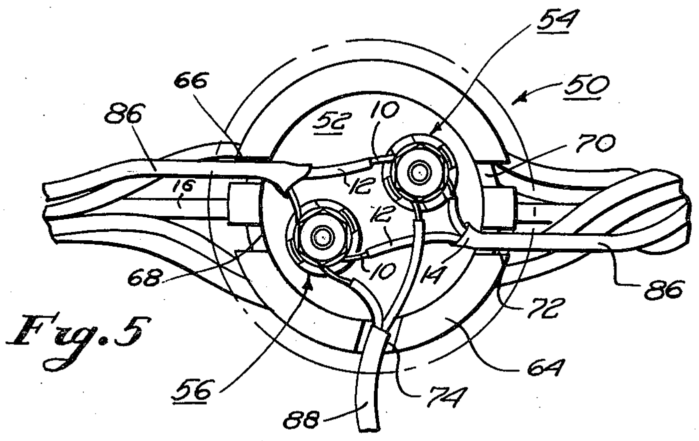
Figure 6:
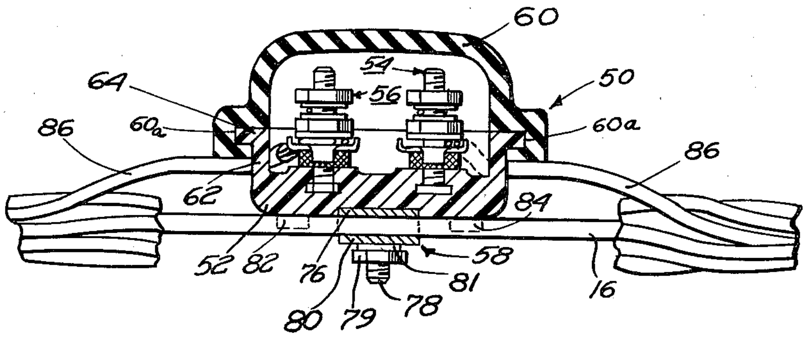

For a fuller understanding of the nature and objects of the invention, reference should be had to the following detailed description taken in connection with the accompanying drawings, in which:

FIGURE 1 is a perspective view of a distribution wire embodying features of my invention, FIGURE 2 is an end view of a pair of insulated conductors of the distribution wire of FIGURE 1, FIGURE 3 is a plot of attenuation as a function of frequency, comparing prior distribution wire with the distribution wire of FIGURE 1, FIGURE 4 is an end view of a jacketed pair of insulated conductors, FIGURE 5 is a side view of a connector mounted on the distribution wire of FIGURE 1, and FIGURE 6 is a bottom view, partly broken away, of the connector and wire of FIGURE 5.

In general, a multiple-pair cable embodying features of my invention comprises a plurality of individually insulated conductors arranged in pairs, with a waterproof jacket enclosing each pair. The jacket provides greater attenuation stability from dry to wet weather conditions by excluding moisture that would otherwise increase the capacity between the conductors enclosed therein. This overcomes the various problems, set forth above, stemming from excessive wet weather attenuation, and thus makes possible improved communication at a substantially lower over-all cost. In addition, the jackets may easily be color-coded for easy pair identification.

Referring to FIGURE 1, a distribution wire embodying the features of my invention comprises a plurality of conductors 10, each covered by an insulator generally indicated at 12. The conductors 10 are arranged in pairs, with a waterproof jacket 14 enclosing each pair to form jacketed pairs indicated at 15. The individual pairs of conductors are twisted with different lays to minimize cross-talk. The jacketed pairs are cabled around an insulated support or messenger wire 16.

A web 18, shown in FIGURE 2, joins the insulated conductors 10 in each pair. The insulators 12 are preferably extruded over the paired conductors simultaneously in a well-known manner, with the web 18 formed integrally in the same process. The web is thus made of the same material as insulator 12 and continuously joins the paired conductors 10 along their center-line. During extrusion, a ridged tracer 20 may be formed in the insulator 12 over one conductor of each pair to facilitate conductor identification.

The web 18 remains joined to the insulated conductors of each pair during such manufacturing processes as application of the jacket 14, the twisting of pairs and subsequent cabling. Although the web separates in spots, especially during the twisting operation, it applies substantially equally to both conductors of each pair the stresses exerted on the conductors 10 during the various manufacturing steps. As a result, the resistances of the conductors in each pair remain substantially equal. In other words, the difference in resistance, or resistance unbalance, between the two conductors of a pair is negligible. The decreased resistance unbalance makes possible improved transmission. Furthermore, the equalization of stresses results in a physically stronger cable.

Referring next to FIGURE 4, jacket 14 is extruded overside over the paired conductors 10. To prevent the jacket from sticking to the insulators 12, the insulated conductors are drawn through the jacket-extruding apparatus at a rate faster than the rate at which the jacket 14 is extruded. The resulting longitudinal stretching of the jacket reduces its diameter somewhat to obtain a fairly snug fit around the pairs of conductors 10 enclosed therein.

The relatively wide, thin web 18 and the weight of the conductors encased in the soft thermoplastic of insulators 12 combine to cause the insulated pairs to "roll" slightly as they issue from the extruder that applies the insulators 12. This loops the web 18 above the centerline of the conductors to resemble the nose bridge of a pair of eyeglasses. However, web 18 has sufficient strength to maintain an air gap 21 between the insulated conductors after they are enclosed in jacket 14. In addition, there are air pocket 23 between jacket 14 and the enclosed conductors.

Since air is an excellent dielectric, continuously distributed air spaces within a cable result in more uniform interconductor capacitance. One drawback of thermoplastic insulation, as compared to formerly used fibrous materials, is that it is denser, entrapping much less air. In my cable, the provision of air gaps 21 between the conductors of each pair decreases and makes more uniform the capacitance between them. The air pockets 23 further decrease the direct capacitance between the conductor pairs. In addition, the capacity between adjacent conductor pairs is similarly improved by the increased average separation of the pairs resulting from the use of separate jackets 14.

The jackets 14 are color-coded, for rapid identification, by two colors, an over-all jacket color and a colored stripe 14*a*. Stripe 14*a* is formed integral with the jacket 14 in the manner described in the copending application of William T. Fraser for "Extruding Apparatus," Serial No. 820,919, filed June 17, 1959, and assigned to the assignee of the present application, now abandoned.

The messenger wire 16, which is preferably insulated with a polyethylene jacket 22, is made of high strength steel. When the cable is installed, the messenger wire is secured to the poles, or other structures from which the distribution wire is suspended, and thus it supports the cable between suspension points.

In distribution wire having six or fewer pairs of conductors, the jacketed pairs are cabled by twisting them around the messenger wire. Cables having more than six pairs generally have the jacketed pairs twisted together into groups. The groups are then twisted around the messenger wire. In this manner, all pairs appear on the outside surface at short intervals along the cable, and, thus each of the conductor pairs is readily accessible.

FIGURE 3 is a graph comparing attenuation characteristics of distribution wire and the improved construction described herein. As noted above, the prior cable is constructed with a plurality of individually insulated conductors, each enclosed in its own outer jacket. The insulated conductors are twisted in pairs, and the pairs are cabled together.

The curve 30 of FIGURE 3 represents the attenuation of prior distribution wire for dry conditions and curve 32 the attenuation of the same wire during heavy rain, or wet conditions. One can readily see that the attenuation of prior distribution wire changes substantially between the dry and wet conditions. For example, when wet, the attenuation of the prior cable increases by about 9.5 db at 400 kilocycles. For comparison, curve 34 represents the attenuation of my improved distribution wire for dry conditions, and curve 36 represents the attenuation under wet conditions. The change in attenuation represented by the difference between the curves 34 and 36, between the dry and wet weather conditions, is substantially less than for the prior cable. The slight increase in dry weather attenuation results from the fact that the conductors 10 in each pair are closer together, and thus the shunt capacity between them is greater than in some prior constructions. In the prior construction, as previously noted, each insulated conductor is enclosed in its own jacket, and thus the conductors are further separated by twice the thickness of the jacket. This is more than the separation in my construction.

The effect of moisture on the transmission characteristics of my jacketed conductor pairs will now be described below with reference to FIGURE 4, wherein moisture film 40 is shown enclosing a jacket 14. The moisture may be assumed to be electrically conductive, and, therefore, film 40 appears electrically as a conductive sheath around the two conductors. Capacitance between each conductor and the common film 40 introduces a shunt capacitance between the conductors. This capacitance increases the attenuation of signals transmitted on the conductor pair.

In prior distribution wire, moisture completely encloses the insulation of each conductor, and the moisture enclosed conductor thus behaves as a coaxial capacitor. Adjacent conductors become coupled as two such capacitors in series. However, in my jacketed-pair wire, the moisture does not intercede between the insulated conductors of each pair. Thus, the wet-weather capacity between adjacent conductors is substantially reduced, thereby effectively stabilizing the capacity against variations in moisture.

As mentioned above, the conductor pairs in a suspended distribution wire are directly tapped for connection to drop wires leading to terminal points, e.g., individual residences. Apparatus for making such connections to my cable is shown in FIGURES 5 and 6. Referring to these figures, a connector generally indicated at 50 has a cup-like dielectric base 52 within which is a pair of terminals indicated at 54 and 56. A clamp generally indicated at 58, secured to the exterior of the base 52, fastens the connector to the messenger wire 16. An elastomeric cap 60, enclosing the terminals 54 and 56, is snapped on the base 52 to protect the terminals and the connections thereto from the elements.

Base 52, preferably of a rigid dielectric material, has a wall 62 flared outwardly to form a lip 64. Slots 66, 68, 70 and 72 in the lip 64 and wall 62 permit the passage of cable conductor pairs through the connector 50, and a slot 74 accommodates a drop wire 88 tapped from the distribution wire.

As seen in FIGURE 6, the clamp 58 has a bearing plate 76 imbedded in the base 52 and a threaded stud 78 extending outwardly from the connector plate 76. A nut 79 and lock washer 81 on the stud 78 bear against a movable jaw 80 which holds the messenger wire 16 against the plate 76. U-shaped guides 82 and 84, integral with the base 52, also engage the messenger wire 16 and thus prevent the base 52 from rotating after it has been fastened to the messenger wire. To allow condensation to drain from the connector 50, it is preferably oriented on the messenger wire with slot 74 directed downwardly.

Returning to FIGURE 5, the jacketed pairs of distribution wire are separated from the messenger wire 16 in order to mount the connector 50 to the latter. The slots 66, 68, 70 and 72 are preferably disposed so as to be in line with the cable when the base 52 is fastened thereto, thus facilitating insertion of the jacketed conductor pairs.

The jacketed pair 86 is connected to a drop wire 88 by first separating the jacketed pair 86 from the messenger wire and engaging it in slots 66 and 72 so that it passes through the connector housing 52. The jacket 14 is removed and the conductors 10 therein separated and stripped of their insulators 12. The conductors are then secured to terminals 54 and 56 along with leads of the wire 88. The conductors of the pair 86 are preferably not cut, and, therefore, with the illustrated terminal disposition, stresses along the pair 86 serve to pull the conductors against the terminals 54 and 56 rather than loosen them.

Cap 60, preferably made of a resilient rubber-like material such as neoprene, is dome-shaped with an inner annular recess 60*a* therein fitting snugly around the lip 64 of base 52. The cap is thus readily removable, yet it provides good protection against the elements when in place.

Thus, I have described an improved multiple-pair cable in which a waterproof jacket is formed over each pair of conductors. The jacket seals the conductors from the effects of weather, so that the attenuation characteristics remain substantially constant during varying weather conditions. The reduced attenuation during wet weather allows longer range transmission between repeaters than heretofore available, and the substantially constant attenuation of my cable makes it possible to cascade a greater number of repeaters than heretofore possible with distribution wire. This permits the use of carrier frequency operation over longer distances than heretofore possible.

I have also described an improved connector attached directly to my cable, which facilitates the making of quick, reliable connections to the jacketed conductor pairs. Other features of my improved cable include provision for rapid pair and conductor identification. The possibility of error in selecting the conductors forming a connection is rendered negligible by the enclosure of each pair in the separate jacket.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A communications cable comprising, in combination:
- (A) a messenger wire; and,
- (B) a plurality of pairs of electrical conductors held to said messenger wire and each comprising:
  - (*a*) electrical insulating material surrounding each of said conductors,
  - (*b*) a water impervious sleeve surrounding each pair of said insulated conductors; and,
  - (*c*) an elongated web
    - (1) spaced away from the closest adjacent portions of said conductors, and
    - (2) said web holding said conductors apart to provide air space between said conductors.

2. The combination defined in claim 1 wherein:
- (B) each of said pairs of conductors further comprise:
  - (*d*) conductor-identifying means integral with the insulating materals surrounding one of each of said pairs of conductors; and
  - (*e*) pair-identifying means integral with said water impervious sleeve.

3. A communications cable comprising, in combination:
- (A) a pair of electrical conductors;
- (B) electrical insulating material surrounding each of said conductors;
- (C) a resilient water impervious sleeve surrounding said conductors and said insulating material; and
- (D) an elongated resilient web
  - (*a*) spaced away from the closest adjacent portions of said conductors, and
  - (*b*) said web producing a force tending to push said conductors apart against said resilient sleeve to provide air space between said insulated conductors.

4. A communications cable comprising, in combination:
- (A) an insulated messenger wire;
- (B) a plurality of pairs of electrical conductors each twisted about said messenger wire and each comprising:
  - (*a*) electrical insulating material surrounding each of said conductors;
  - (*b*) a water impervious sleeve surrounding each pair of insulated conductors; and
  - (*c*) an elongated resilient web
    - (1) integral with and formed of said electrical insulating material,
    - (2) spaced away from the closest adjacent portion of said conductors,
    - (3) said web held in a U-shaped configuration, and
    - (4) forcing said conductors apart against said sleeve to provide air space between said insulated conductors.

References Cited in the file of this patent

UNITED STATES PATENTS

| | | |
|---|---|---|
| 1,721,218 | Hood | July 16, 1929 |
| 2,185,944 | Holmes | Jan. 2, 1940 |
| 2,471,752 | Ingmanson | May 13, 1949 |
| 2,473,965 | Morrison et al. | June 21, 1949 |
| 2,683,304 | Channell | July 13, 1954 |
| 2,948,020 | D'Ascoli | Aug. 9, 1960 |

FOREIGN PATENTS

| | | |
|---|---|---|
| 387,789 | Great Britain | Feb. 16, 1933 |
| 153,121 | Austria | Apr. 11, 1938 |
| 197,457 | Austria | Apr. 25, 1958 |
| 1,025,027 | Germany | Feb. 27, 1958 |